(12) United States Patent
Zhang (10) Patent No.: US 12,206,307 B2
(45) Date of Patent: Jan. 21, 2025

(54) ELECTRIC MACHINE INSERT DEVICE

(71) Applicant: FORD GLOBAL TECHNOLOGIES, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 18/099,569

(22) Filed: Jan. 20, 2023

(65) Prior Publication Data
US 2024/0250572 A1    Jul. 25, 2024

(51) Int. Cl.
*H02K 5/24* (2006.01)
*H02K 1/16* (2006.01)
*H02K 3/487* (2006.01)

(52) U.S. Cl.
CPC ............... *H02K 3/487* (2013.01); *H02K 1/16* (2013.01)

(58) Field of Classification Search
CPC .. H02K 1/16–1/165; H02K 3/12; H02K 3/16; H02K 3/42; H02K 3/46; H02K 3/48; H02K 3/487; H02K 3/50; H02K 5/24
See application file for complete search history.

(56) References Cited

U.S. PATENT DOCUMENTS

| | | | |
|---|---|---|---|
| 7,034,428 B2 | 4/2006 | Cai et al. | |
| 11,411,460 B2 | 8/2022 | Dunn | |
| 2011/0273055 A1* | 11/2011 | Pengov | ................... H02K 1/16 |
| | | | 310/216.132 |

FOREIGN PATENT DOCUMENTS

| | | |
|---|---|---|
| CN | 106208437 A | 12/2016 |
| CN | 109038878 A | 12/2018 |
| JP | 6739497 B2 * | 8/2020 |

* cited by examiner

*Primary Examiner* — Ramon M Barrera
(74) *Attorney, Agent, or Firm* — David B. Kelley; Brooks Kushman P.C.

(57) ABSTRACT

An electric machine includes a plurality of laminations stacked to form a stator defining an end face and a plurality of slots spaced about a circumference of the stator. The electric machine further includes a plurality of inserts each disposed, and bonded to a portion of the end face, between an adjacent pair of the slots, and each defining an outer triangular-shaped tip that is radially outside the adjacent pair of the slots. The electric machine further includes end windings extending out from the adjacent pair of the slots and bent over a corresponding one of the inserts such that the end windings engage the corresponding one of the inserts and exert a compression force on the corresponding one of the inserts and the laminations.

20 Claims, 6 Drawing Sheets

ELECTRIC MACHINE INSERT DEVICE

TECHNICAL FIELD

The present disclosure generally relates to a stator of an electric machine. More specifically, the present disclosure relates to an insert device of a stator of an electric machine.

BACKGROUND

Electric vehicles (EVs) are propelled by an electric machine (electric motor) having a stator and a rotor. A stator housing may be made by holding a plurality of pieces of laminations together (sometimes hundreds of pieces). While in operation, the rotating force of the rotor may cause vibrations.

SUMMARY

An electric machine includes a plurality of laminations stacked to form a stator defining an end face and a plurality of slots spaced about a circumference of the stator. The electric machine further includes a plurality of inserts each disposed, and bonded to a portion of the end face, between an adjacent pair of the slots, and each defining an outer triangular-shaped tip that is radially outside the adjacent pair of the slots. The electric machine further includes end windings extending out from the adjacent pair of the slots and bent over a corresponding one of the inserts such that the end windings engage the corresponding one of the inserts and exert a compression force on the corresponding one of the inserts and the laminations.

An electric machine includes a plurality of laminations stacked to form a stator defining an end face and a plurality of slots spaced about a circumference of the stator. The electric machine further includes a plurality of inserts each disposed, and bonded to a portion of the end face, between an adjacent pair of the slots, and each defining an outer rounded tip that is radially outside the adjacent pair of the slots. The electric machine further includes end windings extending out from the adjacent pair of the slots and bent over a corresponding one of the inserts such that the end windings engage the corresponding one of the inserts and exert a compression force on the corresponding one of the inserts and the laminations.

An electric machine includes a plurality of laminations stacked to form a stator defining an end face and a plurality of slots spaced about a circumference of the stator. The electric machine further includes a plurality of inserts each disposed, and bonded to a portion of the end face, between an adjacent pair of the slots, and each defining a radial length longer than a length of the adjacent pair of the slots. The electric machine further includes end windings extending out from the adjacent pair of the slots and bent over a corresponding one of the inserts such that the end windings engage the corresponding one of the inserts and exert a compression force on the corresponding one of the inserts and the laminations.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
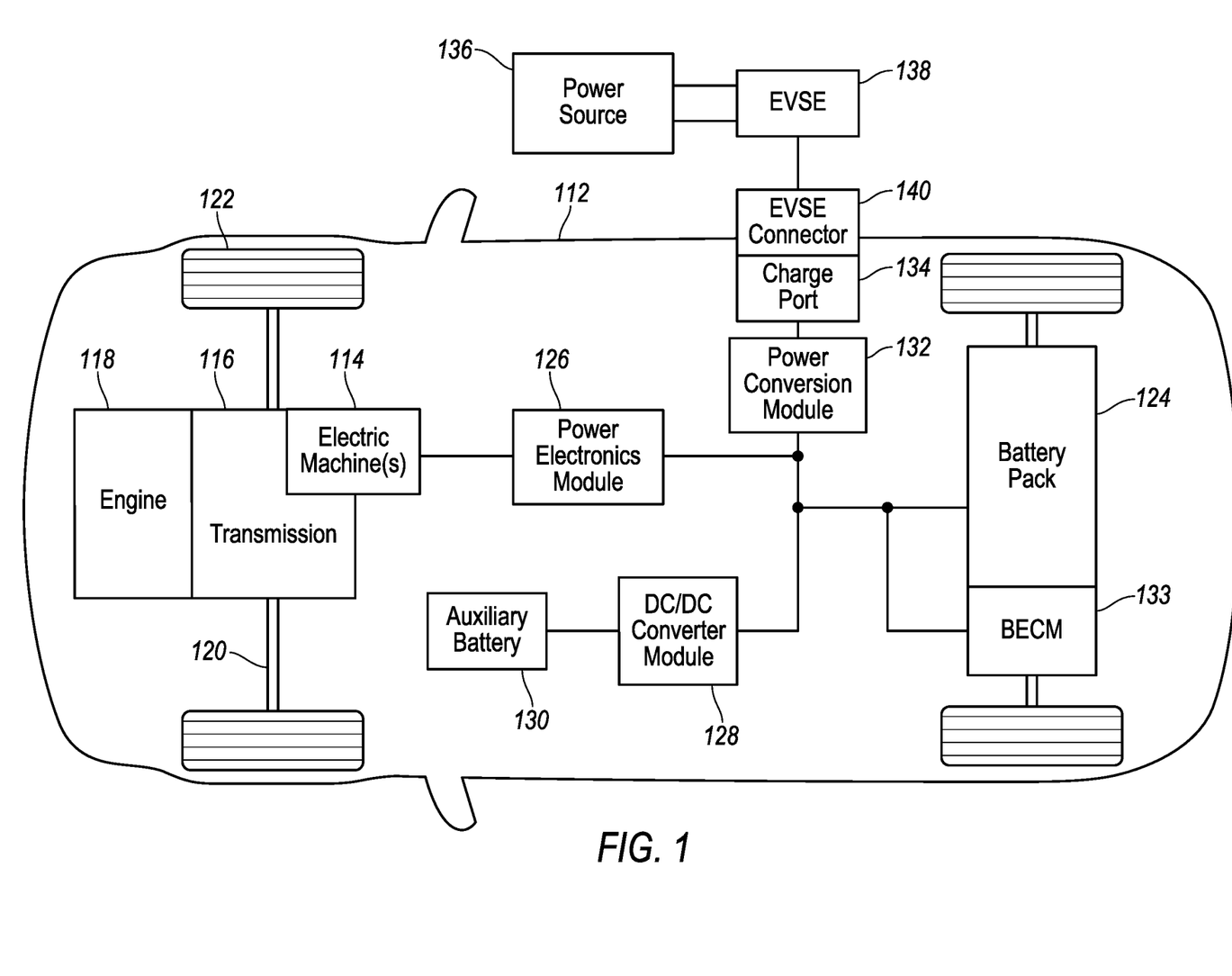
FIG. 1 is a schematic diagram illustrating an example of an electric vehicle.

FIG. 1 illustrates a schematic representation of an example of an electrified vehicle. In this example, the electrified vehicle is a plug-in hybrid electric vehicle (PHEV) referred to as a vehicle 112 herein. The vehicle 112 may include one or more electric machines 114 mechanically connected to a hybrid transmission 116. Each of the electric machines 114 may be capable of operating as a motor or a generator and may include a stator and a terminal block assembly. In addition, the hybrid transmission 116 is mechanically connected to an engine 118. The hybrid transmission 16 is also mechanically connected to a drive shaft 120 that is mechanically connected to wheels 122. The electric machines 114 may provide propulsion capability when the engine 118 is turned on or off. The electric machines 114 may also operate as generators and provide fuel economy benefits by recovering energy that would normally be lost as heat in the friction braking system. The electric machines 114 may also provide reduced emissions since the vehicle 112 may be operated in electric mode under certain conditions.

A traction battery 124 stores energy that can be used by the electric machines 114. The traction battery 124 typically provides a high-voltage DC output from one or more battery cell arrays, sometimes referred to as battery cell stacks, within the traction battery 124. The battery cell arrays may include one or more battery cells. The traction battery 124 is electrically connected to one or more power electronics modules 126 through one or more contactors (not shown). The one or more contactors isolate the traction battery 124 from other components when opened and connect the traction battery 124 to the other components when closed.

The power electronics module 126 is also electrically connected to the electric machines 114 and provides an ability to bi-directionally transfer electrical energy between the traction battery 124 and the electric machines 114. For example, a typical traction battery 124 may provide a DC voltage while the electric machines 114 may require a three-phase AC voltage to function. The power electronics module 126 may convert the DC voltage to a three-phase AC voltage as required by the electric machines 114.

In a regenerative mode, the power electronics module 126 may convert the three-phase AC voltage from the electric machines 114 acting as generators to the DC voltage required by the traction battery 124. Portions of the description herein are equally applicable to a pure electric vehicle. For a pure electric vehicle, the hybrid transmission 116 may be a gear box connected to an electric machine 114 and the engine 118 is not present.

In addition to providing energy for propulsion, the traction battery 124 may provide energy for other vehicle electrical systems. A typical system may include a DC/DC converter module 128 that converts the high-voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. In a typical vehicle, the low-voltage systems are electrically connected to an auxiliary battery 130 (e.g., a twelve-volt battery).

A battery electrical control module (BECM) 133 may be in communication with the traction battery 124. The BECM 133 may act as a controller for the traction battery 124 and may also include an electronic monitoring system that manages temperature and charge state of each battery cell of the traction battery 124.

The vehicle 112 may be recharged by an external power source 136 such as an electrical outlet. The external power source 136 may be electrically connected to an electric vehicle supply equipment (EVSE) 138. The EVSE 138 may provide circuitry and controls to manage the transfer of electrical energy between the power source 136 and the vehicle 112. The external power source 136 may provide DC or AC electric power to the EVSE 138. The EVSE 138 may have a charge connector 140 for plugging into a charge port 134 of the vehicle 112.

The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The charge connector 140 may have pins that mate with corresponding recesses of the charge port 134.

The various components discussed above may have one or more associated controllers to control and monitor the operation of the components. The controllers may communicate via a serial bus (e.g., a controller area network (CAN)) or via discrete conductors.

Figure 2:
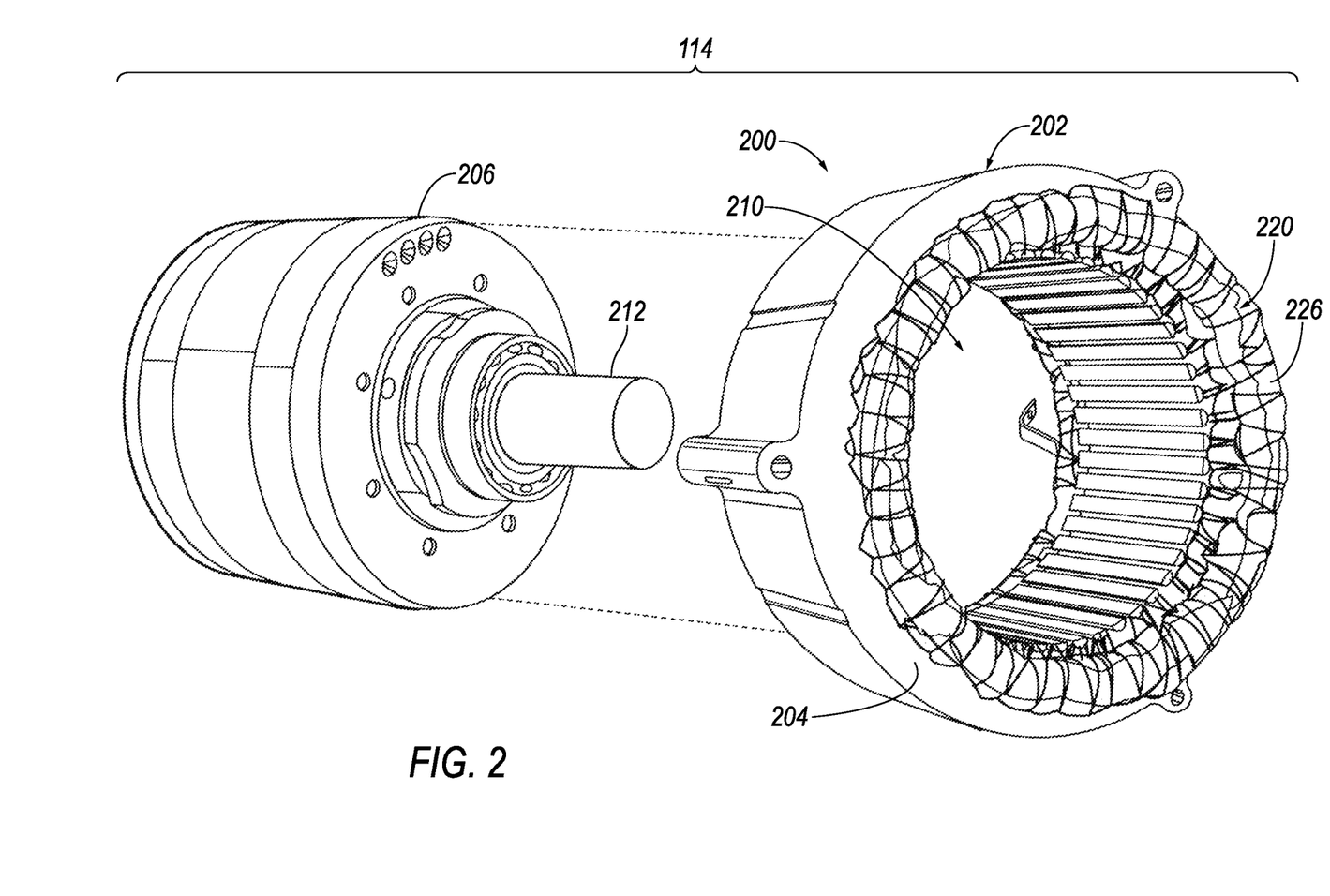
FIG. 2 is a perspective, partially exploded view of an example of a portion of a vehicle electric machine assembly.

FIG. 2 is a partially exploded view illustrating an example of portions of an electric machine assembly for an electrified vehicle, referred to generally as an electric machine 114 herein. The electric machine 114 may include a stator core (or stator) 202 and a rotor 206. The stator core 202 may include a generally cylindrical-shaped housing 204 which defines a cavity 210 on the inner side of the cylinder. The rotor 206 may be sized for disposal and operation within the cavity 210. A shaft 212 may be operably connected to the rotor 206 and may be coupled to other vehicle components to transfer mechanical power therefrom.

Electrical windings 220 may be disposed within the cavity 210 of the stator core 202. In an electric machine motor example, current may be fed to the electrical windings 220 to obtain a rotational force on the rotor 206. In an electric machine generator example, current generated in the electrical windings 220 by a rotation of the rotor 206 may be used to power vehicle components. Portions of the electrical windings 220, such as end windings 226, may extend from the cavity 210. The rotor 206 may include magnets such that rotation of the rotor 206 in cooperation with an electric current running through the end windings 226 generates one or more magnetic fields. For example, electric current running through the end windings 226 generates a rotating magnetic field such that magnets of the rotor 206 will magnetize and rotate with the rotating magnetic field to rotate the shaft 212 for mechanical power.

Figure 3:
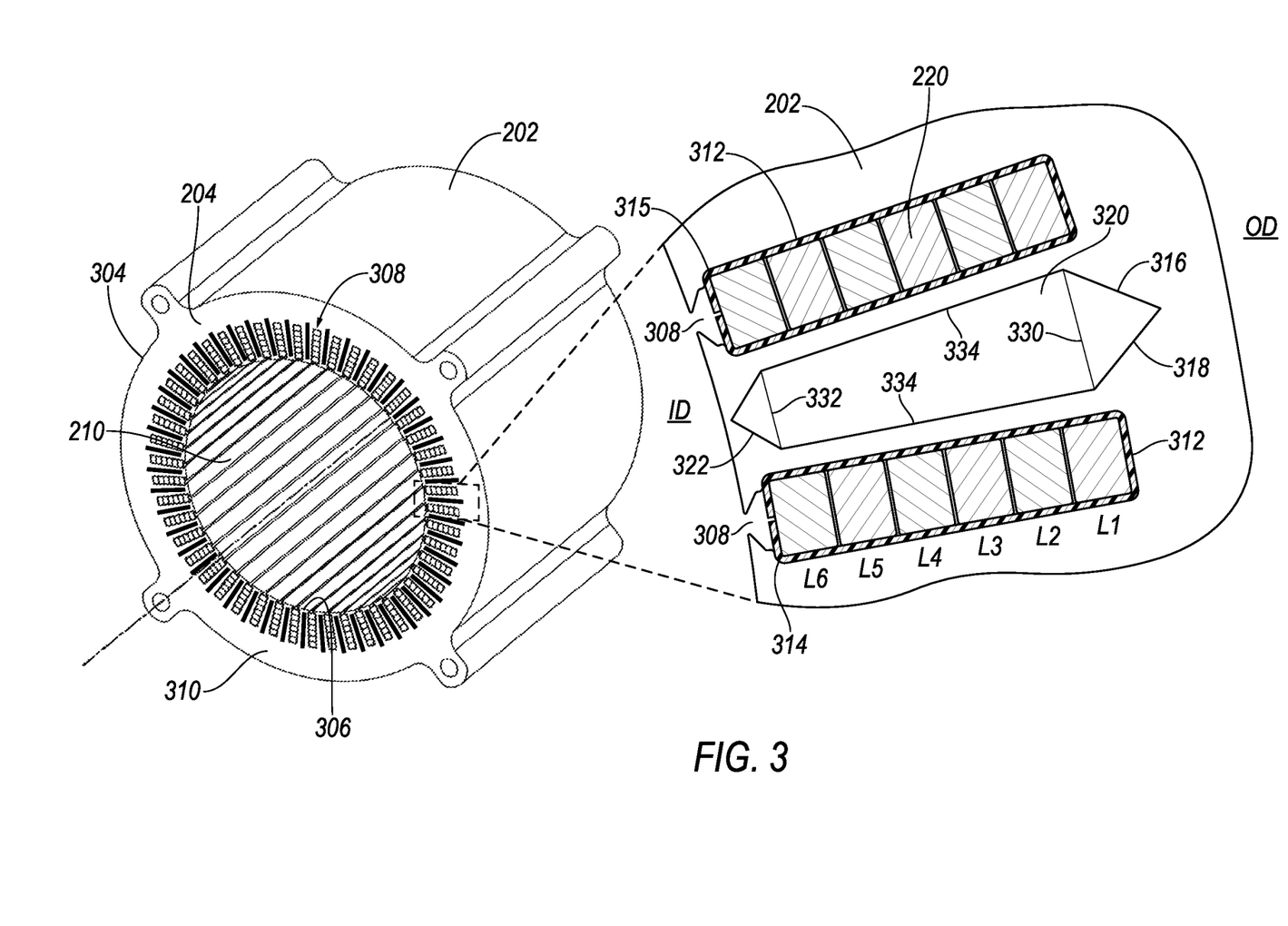
FIG. 3 is a perspective view of a stator with an exploded view of one or more stator slots.

FIG. 3 depicts an exploded view of a stator 202. The housing 204 of the stator 202 may include a plurality of laminations (not shown) having a front side and a back side. When stacked, the front and back sides are disposed against adjacent front and back sides to form the housing 204. Each lamination also includes an outer side (or outer wall, outer diameter "OD") 304 and an inner side (or inner wall, inner diameter "ID") 306. The outer sides 304 cooperate to define an outer surface of the stator 202, and the inner sides 306 cooperate to define the cavity 210.

The stator core 202 may include a plurality of slots 308 spaced about a circumference of the stator core housing 204. The windings 220 may be wrapped around the stator 202 and are disposed within the stator slots 308. The windings 220 may be routed throughout the slots 308 in a serpentine fashion to create one or more winding paths to transmit current through the stator 202. Based on the arrangement of the windings 220, portions of the windings may protrude from an end face 310 of the stator core 202 forming the end windings 226. In some specific examples, the windings 220 include copper hairpin windings that are routed throughout an iron alloy stator core 202. A plurality of individual hairpins may be inserted axially through slots 308 and have end portions that protrude beyond end face 310 to adjoin hairpins in adjacent slots. The slots 308 may further include at least one slot liner 312 to provide insulation between the at least one winding 220 and the stator 202. The slot liner 312 may be made of multiple layers of specialized paper, plastic, or the like for optimal dielectric and mechanical strength. In one example, the slot liner 312 may be approximately 0.2 mm thick. Once installed, a first minor gap 314 may be formed between the slot liner 312 and the housing 204. In one example, the first minor gap may be approximately 0.05-0.1 mm wide. A second minor gap 315 may be formed between the windings 220 and the slot liner 312. In one example the second minor gap may be approximately 0.1-0.15 mm wide. The gaps 314, 315 may be injected with varnish to reduce displacements caused by vibrations and for insulation purposes (to be discussed in detail below).

As discussed above, the hairpin windings 220 may be routed through the slots 308 of the stator core 202. The hairpin windings 220 may be arranged as wave windings in which the windings 220 weave from pole to pole in a wave-like pattern. It should be noted that the windings 220 are shown as cross-sections in FIG. 3 for illustrative purposes. The electric machine 114 of the present disclosure may be a three-phase current electric machine in which the hairpin windings 220 are arranged in three electrical phases. The phases may be referred to as first, second, and third phases (or X, Y, Z phases) in any order. In the examples of the present disclosure, each phase includes a plurality of individual hairpin conductors arranged in parallel winding paths. This disclosure, however, should not be construed as limited to an electric machine having three electrical phases but should be construed to include an electric machine having at least one electrical phase or a plurality of electrical phases.

The slots 308 may include an outer radial layer of hairpins (i.e. L1 and L2), a middle radial layer of hairpins (i.e. L3 and L4), and an inner radial layer of hairpins (i.e. L5 and L6). Each of the layers may include at least two radial pin positions that are adjacent to each other. In the illustrated embodiment, each slot 308 has six sequential pin positions (L1 through L6) in a linear arrangement. However, other arrangements may be contemplated under essentially the same concept. The first position L1, is nearest the outer side 304 of the stator core 202 and the sixth position L6 is nearest the inner side 306 of the stator core 202.

A stator insert (or insert device) 316 may be positioned between two slots 308. Conventionally, the stator core 202 may be made without the presence of the inserts placed between slots. In the present example, the insert 316 may include an arrowhead-shaped outer section 318 pointing toward the outer side 304 of the stator core 202, an arrowhead-shaped inner section 322 pointing toward the inner side 306 of the stator core 202, and a trapezoid-shaped body section 320 connected between the outer section 318 and the inner section 322. The trapezoid-shaped body section 320 may include a larger-sized end (or base) 330 toward the outer side 304 of the stator core 202 and a smaller-sized end (or base) 332 toward the inner side 306 of the stator core 202 since the space between the two adjacent slots 308 are larger on the outer side 304 than on the inner side 306. The larger and smaller sized end/base 330, 332 may be connected via two legs 334 on each side of the body section 320. In one example, the legs 334 on each side may be parallel to the edge of the slot 308 of the corresponding side. Similarly, the arrowhead-shaped outer section 318 is larger in size compared with the arrowhead-shaped inner section 322. The stator insert 316 may be made of a variety of materials. As a few non-limiting examples, the insert 316 may be made of ceramic or plastic materials which may withstand high temperature up to 250° C. Options for the plastic materials may include polyamide-imides, polyphenylene sulfide (PPS), polyphenylene oxide (PPO) or the like.

Figure 4:
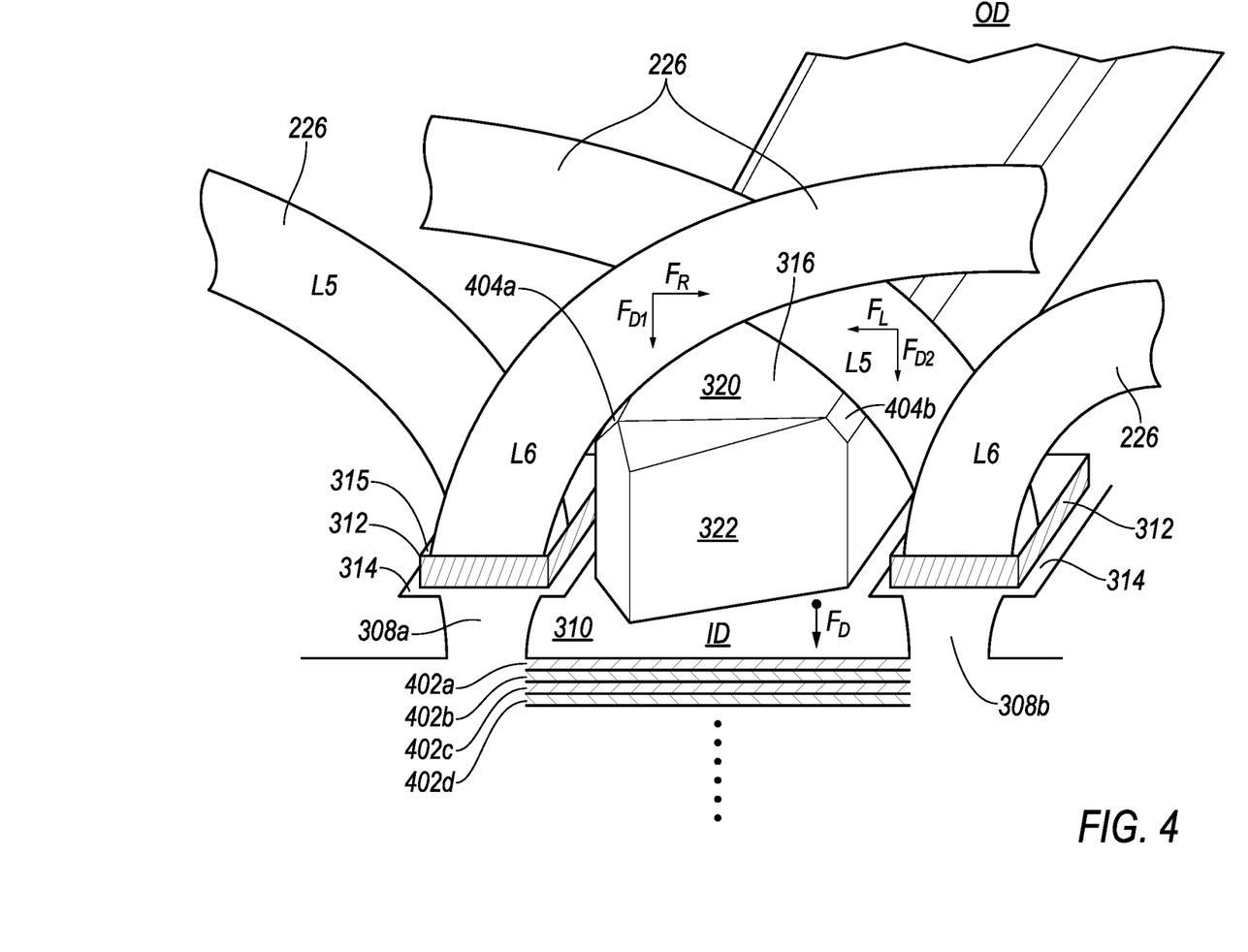
FIG. 4 is a perspective view of an insert positioned on a stator end face viewed from the inner side.

FIG. 4 depicts a perspective view of the insert 316 positioned on the stator end face 310 viewed from the inner side 306. With continuing reference to FIGS. 1-3, the insert 316 may be placed on the stator end face 310 between two adjacent slots 308. One or more end winding hairpins 226 may extend from the respective slot 308 in a wave-like pattern. For instance, each slot 308 may be configured to accommodate six layers of winding hairpins (e.g. L1-L6). Viewed from the inner side 306, in the present example, the first end winding hairpin 226 L6 from the first slot 308a (left to the insert 316) may extend to the right toward the direction of the insert 316. A lower edge of the first end winding hairpin 226 L6 may engage with an edge or surface 404a of the body section 320 of the insert 316 creating a force with a first downward component $F_{D1}$ and rightward component $F_R$. Similarly, a second end winding hairpin 226 L5 from the second slot 308b (right to the insert 316) may extend to the left toward the direction of the insert 316. A lower edge of the second end winding hairpin 226 L5 may engage with opposite edge 404b or surface of the body section 320 of the insert 316 creating a force with a second downward component $F_{D2}$ and a leftward component $F_L$. The rightward component $F_R$ of the force created by the first end winding hairpin 226 L6 and the leftward component $F_L$ of the force created by the second end winding hairpin 226 L5 may cancel out each other, whereas the downward components $F_{D1}$ and $F_{D2}$ of the two forces may add up to a stronger downward force FD which is desirable to hold the stator end face 310 down against the plurality of laminations.

As discussed above, the stator housing 204 may be made of a plurality of laminations 402 stacked and disposed against adjacent front and back sides of each other. The downward force created by the end winding hairpins 226 engaging with the insert 316 may strengthen the structure of the stator housing 204. Similarly, the end winding hairpins 226 of L4 and L2 from the first slot 308a and the end winding hairpins 226 of L3 and L1 from the second slot 308b may all extend toward the direction of and engage with the insert 316 which further increases the downward force. As illustrated in FIG. 4, the body section 320 of the insert 316 may include one or more upper tapered edges/surfaces 404 configured increase the engagement contacting surface area with the end winding hairpins 226. In an alternative example, the tapered edge may include a rounded surface corresponding to the curvature of the end winding hairpins 226. In one example, the downward force created by the end winding hairpins 226 may be sufficient to hold the insert 316 in place and other fixing mechanisms may be unnecessary. Alternatively, the insert 316 may be placed on the stator end face 310 using adhesives prior to the placement of the end winding hairpins 226.

Figure 5A:
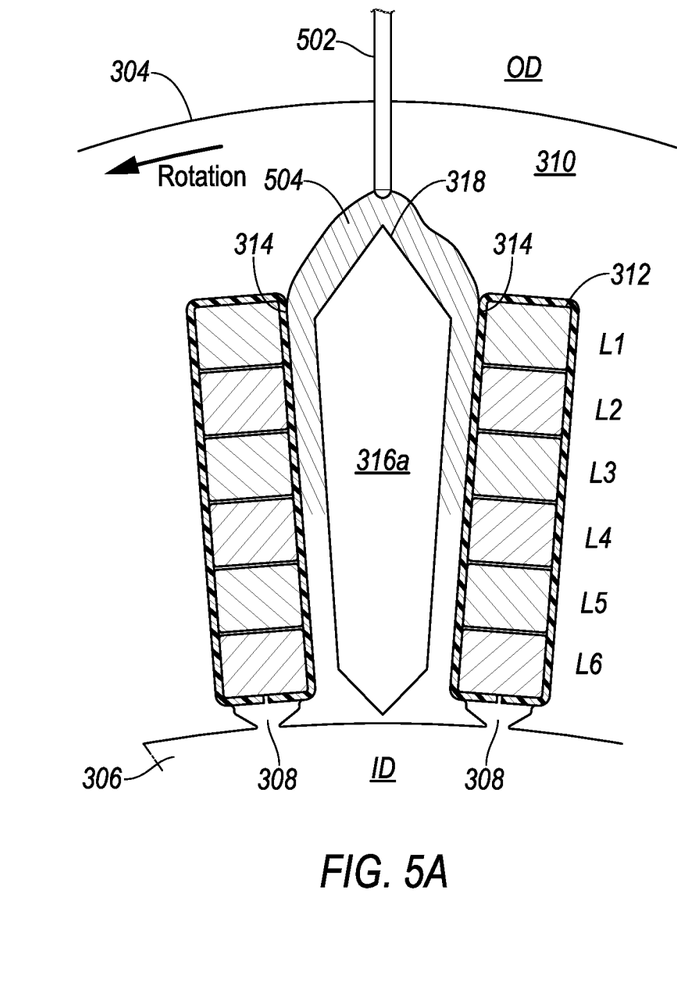
FIGS. 5A and 5B are views of the stator with the insert during a varnishing process.
Figure 5B:
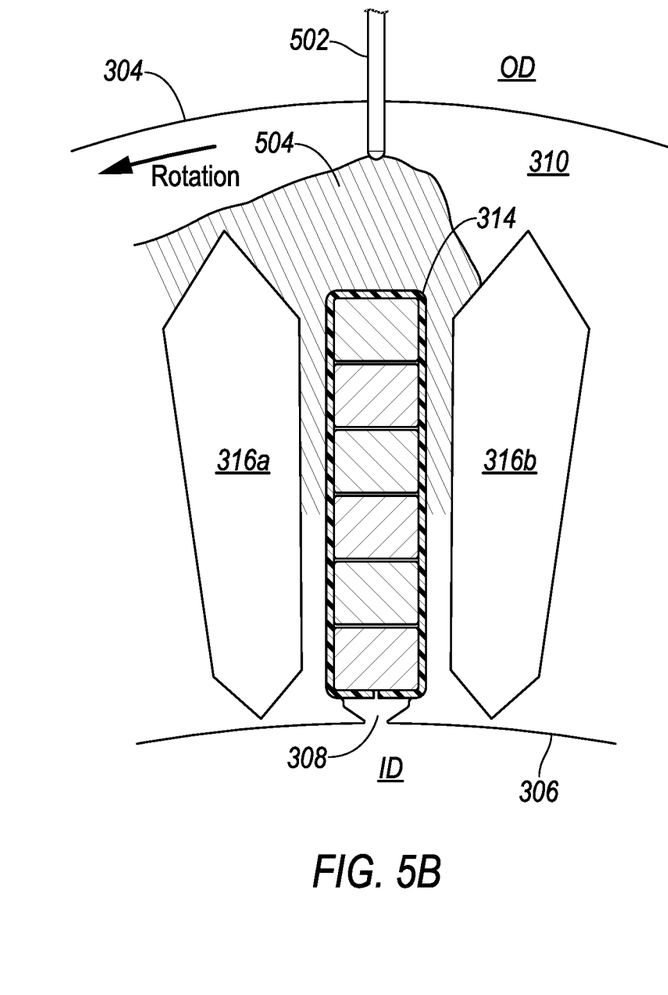

FIGS. 5A and 5B depict top views of the stator with the inserts during a varnishing process. As discussed above, the stator core 202 may be injected with varnish for insulation purposes. With continuing reference to FIGS. 1 to 4, the varnish injection may be performed on the end face 310 stator core in the present example. Referring to FIG. 5A, the varnishing may be performed via a varnish injector 502 injecting varnish material 504 from the outer side 304 of the stator core 202. The varnish material 504 may include one or more insulating materials such as resin, epoxy, alkyd or the like. The varnish material 504 may be configured to be in the form of liquid during the injection and cure/solidify in a short period of time thereafter. After being injected to the end face 310 of the stator core 202, the varnish material 504 may flow between the inserts 316 and the slots 308 and fill the gap 314 between the slot liner 312 and the housing 204. As illustrated in FIG. 5A, the arrowhead-shaped outer end 318 of the insert 316 may facilitate to split the varnish flow from the injector 502 and direct the varnish material 504 to enter the designated regions (i.e. shaded area). The designated regions may include the space between each insert 316 and the adjacent slot 308. The designated regions may further include the first gap 314 between the slot liner 312 and the housing 204. Additionally, the designated regions may further include the second gap 315 between the windings 220 and the slot liner 312 in some examples. Since the insert 316 takes an area between the two adjacent slots 308, the amount of varnish material 504 may be reduced.

In the present example, the varnish process may be performed in a rotational manner. That is, the stator core 202 may be rotated relative to the injector (e.g. counter clockwise in the present example) while the injector 502 continues to inject the varnish material 504 onto the end face 310. Referring to FIG. 5B, as the stator core 202 is rotated counter clockwise, as the first insert 316a may rotate away from the injector 502, the slot 308 now may directly face the injector 502. The varnish material 504 continues to flow into the designated regions as the stator core 202 rotates. The process continues until all designated regions are covered/filled with the varnish material 504. It is noted that although the injection is performed from the outside direction 304 of the stator core 202 in the example illustrated with reference to FIGS. 5A and 5B, the present disclosure is not limited thereto and the injection from the inside direction 306 may be performed under essentially the same concept. The arrowhead-shaped inner end 322 may be configured to split and direct the varnish flow in the inside direction injection process. In an alternative example, the complete varnishing process may require the injections from both the outside direction 304 and the inside direction 306 performed simultaneously or consecutively.

Figure 6A:
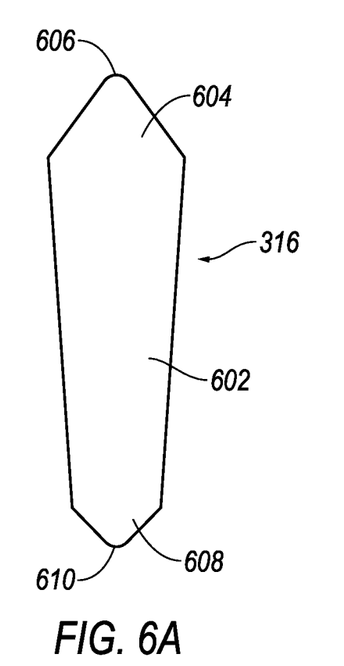
FIGS. 6A to 6E are views of alternative shapes for the inserts.

FIGS. 6A to 6E depict alternative shapes for the insert 316. Referring to FIG. 6A, the insert 316 may include a trapezoid-shaped body section 602 having a longer base directed toward the outer side 304 and a shorter base directed toward the inner side 304 once installed on the stator core 202. The insert 316 may further include an arrowhead-shaped outer section 604 connected to the body section 602 at the longer base and an arrowhead-shaped inner section 608 connected to the body section 602 at the shorter base. Different from the insert 316 illustrated with reference to FIG. 3, one or more of the outer or inner ends may include a rounded apex in the present example. For instance, the outer section 604 may include a rounded apex 606 and the inner section 608 may include a rounded apex 610.

Figure 6B:
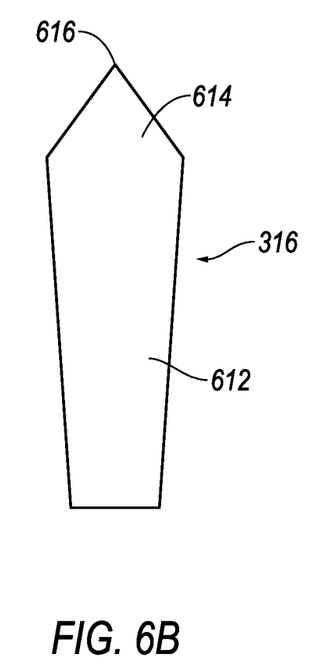

Referring to FIG. 6B, the insert 316 of an alternative shape is illustrated. The insert 316 may include a trapezoid-shaped body section 612 having a longer base directed toward the outer side 304 and a shorter base directed toward the inner side 304 once installed on the stator core 202. The insert 316 may further include an arrowhead-shaped outer section 614 connected to the body section 612 at the longer base with an apex 616 pointing toward the outer side 304 configured to split and direct the varnish flow during the injections. Since only one apex 616 on the outer section 614 is present, the insert 316 in this example may be more suitable for the varnish injection from the outside direction than from the inside direction.

Figure 6C:
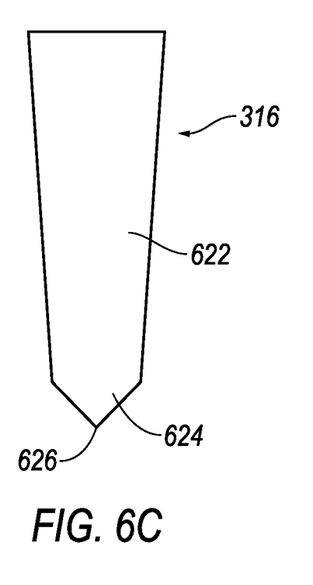

Referring to FIG. 6C, the insert 316 of another alternative shape is illustrated. The insert 316 may include a trapezoid-shaped body section 622 having a longer base directed toward the outer side 304 and a shorter base directed toward the inner side 306 once installed on the stator core 202. The insert 316 may further include an arrowhead-shaped inner section 624 connected to the body section 612 at the shorter base with an apex 626 pointing toward the inner side 306 configured to split and direct the varnish flow during the injections. Since only one apex 626 on the inner section 624 is present, the insert 316 in this example may be more suitable for the varnish injection from the inside direction than from the outside direction.

Figure 6D:
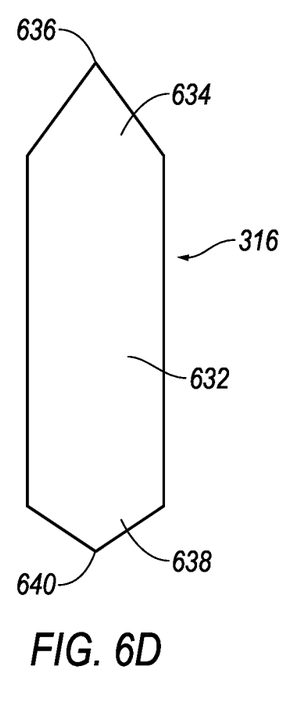

Referring to FIG. 6D, the insert 316 of yet another alternative shape is illustrated. Different from the rest of the insert shapes, the insert 316 in the present example may include a rectangular-shaped body section 632. A first arrowhead-shaped section 634 and a second arrowhead-shaped section 638 may be connected to the body section 632 at the opposite sides of the rectangle. The first and second arrowhead-shaped sections 634 and 638 may be of different shapes having different degrees on each respective apex. As illustrated in FIG. 6D, the first arrowhead-shaped section 634 may have a sharper apex 636 compared with the second arrowhead-shaped section 638 having a blunter apex 640.

Figure 6E:
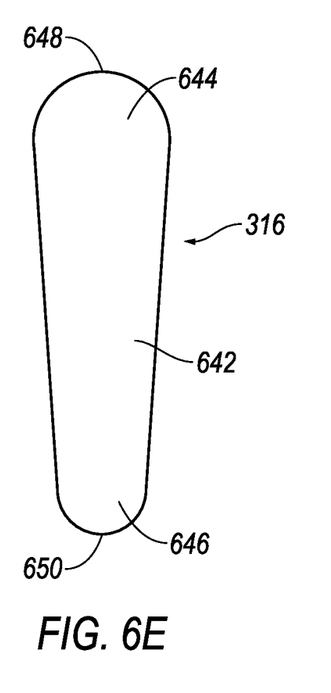

Referring to FIG. 6E, the insert 316 of yet another alternative shape is illustrated. The insert 316 may include a trapezoid-shaped body section 642 having a longer base directed toward the outer side 304 and a shorter base directed toward the inner side 306 once installed on the stator core 202. The insert 316 may further include an outer section 644 connected to the longer base of the body section 642. The outer section 644 may include a curved outer surface 648 without an apex protruding from the surface 648. The insert 316 may further include an inner section 646 connected to the shorter base of the body section 642. The inner section 646 may include a curved outer surface 650 without an apex protruding from the surface 650.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine, comprising:
    a plurality of laminations stacked to form a stator defining an end face and a plurality of slots spaced about a circumference of the stator;
    a plurality of inserts each disposed, and bonded to a portion of the end face, between an adjacent pair of the slots, and each defining an outer triangular-shaped tip that is radially outside the adjacent pair of the slots; and
    end windings extending out from the adjacent pair of the slots and bent over a corresponding one of the inserts such that the end windings engage the corresponding one of the inserts and exert a compression force on the corresponding one of the inserts and the laminations.

2. The electric machine of claim 1, wherein the plurality of inserts each further defines an inner triangular-shaped tip that is radially inside the adjacent pair of the slots.

3. The electric machine of claim 2, wherein the plurality of inserts each further defines a trapezoid-shaped body connected between the outer triangular-shaped tip at a first base and the inner triangular-shaped tip at a second base shorter than the first base.

4. The electric machine of claim 3, wherein the trapezoid-shaped body defines a one or more tapered surfaces configured to engage with one or more of the end windings.

5. The electric machine of claim 2, wherein the plurality of inserts each further defines a rectangular-shaped body connected between the outer triangular-shaped tip and the inner triangular-shaped tip.

6. The electric machine of claim 5, wherein the rectangular-shaped body defines one or more tapered surfaces configured to engage with one or more of the end windings.

7. The electric machine of claim 2, wherein an insert length defined from the outer triangular-shaped tip to the inner triangular-shaped tip is longer than a length of an adjacent slot.

8. The electric machine of claim 1, wherein the one or more of the plurality of slots are at least partially filled with varnish.

9. An electric machine, comprising:
a plurality of laminations stacked to form a stator defining an end face and a plurality of slots spaced about a circumference of the stator;
a plurality of inserts each disposed, and bonded to a portion of the end face, between an adjacent pair of the slots, and each defining an outer rounded tip that is radially outside the adjacent pair of the slots; and
end windings extending out from the adjacent pair of the slots and bent over a corresponding one of the inserts such that the end windings engage the corresponding one of the inserts and exert a compression force on the corresponding one of the inserts and the laminations.

10. The electric machine of claim 9, wherein the plurality of inserts each further defines an inner rounded tip that is radially inside the adjacent pair of the slots.

11. The electric machine of claim 10, wherein the plurality of inserts each further defines a trapezoid-shaped body connected between the outer rounded tip at a first base and the inner rounded tip at a second base shorter than the first base.

12. The electric machine of claim 11, wherein the trapezoid-shaped body defines one or more tapered surfaces configured to engage with one or more of the end windings.

13. The electric machine of claim 10, wherein the plurality of inserts each further defines a rectangular-shaped body connected between the outer rounded tip and the inner rounded tip.

14. The electric machine of claim 10, wherein an insert length defined from the outer triangular-shaped tip to the inner triangular-shaped tip is longer than a length of an adjacent slot.

15. The electric machine of claim 1, wherein the one or more of the plurality of slots are at least partially filled with varnish.

16. An electric machine, comprising:
a plurality of laminations stacked to form a stator defining an end face and a plurality of slots spaced about a circumference of the stator;
a plurality of inserts each disposed, and bonded to a portion of the end face, between an adjacent pair of the slots, and each defining a radial length longer than a length of the adjacent pair of the slots; and
end windings extending out from the adjacent pair of the slots and bent over a corresponding one of the inserts such that the end windings engage the corresponding one of the inserts and exert a compression force on the corresponding one of the inserts and the laminations.

17. The electric machine of claim 16, wherein the plurality of inserts each further defines an inner tip that is radially inside the adjacent pair of the slots.

18. The electric machine of claim 17, wherein the inner tip is triangular-shaped.

19. The electric machine of claim 17, wherein the plurality of inserts each further defines an outer tip that is radially outside the adjacent pair of the slots.

20. The electric machine of claim 19, wherein the outer tip is triangular-shaped.

* * * * *